P. A. PEER.
Waste-Valve for Pumps.
No. 215,156. Patented May 6, 1879.
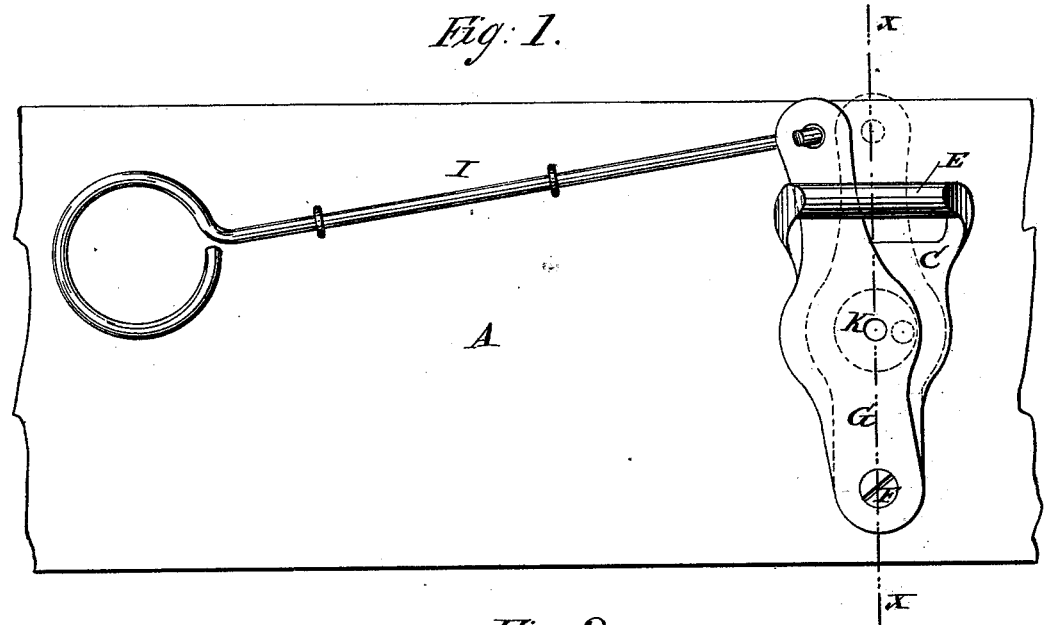
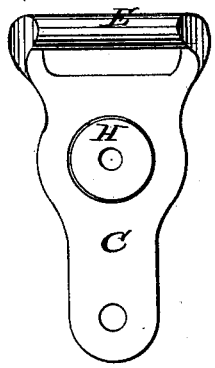
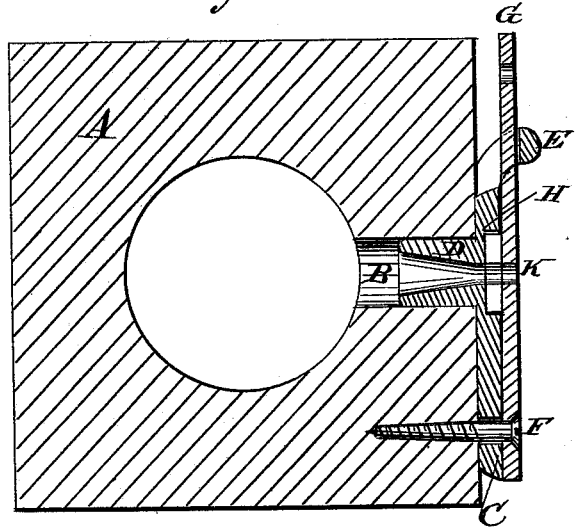
WITNESSES:
Achilles Schehl.
C. Sedgwick
INVENTOR:
P. A. Peer
BY Munn &Co
ATTORNEYS.

UNITED STATES PATENT OFFICE.

PERRY A. PEER, OF COMSTOCK, MICHIGAN.

IMPROVEMENT IN WASTE-VALVES FOR PUMPS.

Specification forming part of Letters Patent No. 215,156, dated May 6, 1879; application filed February 11, 1879.

*To all whom it may concern:*

Be it known that I, PERRY A. PEER, of Comstock, in the county of Kalamazoo and State of Michigan, have invented a new and Improved Waste-Valve for Pumps, of which the following is a specification.

Figure 1 is a plan of the valve applied. Fig. 2 is a cross-section through line $xx$. Fig. 3 is a plan of the valve base-plate.

Similar letters of reference indicate corresponding parts.

The object of this invention is to construct a waste-valve to apply to wooden or metal pumps to let off the water in them for the purpose of preventing freezing.

In the drawings, A represents a section of a pump having a small hole in it at B. C is the base-plate of the valve, and has on its reverse side a tubular projection, D, to drive or screw into the hole B in the pump. At one end of the base-plate is a loop, E, which holds one end of the cover down, and guides and stops it in opening and closing the valve. At the other end of the base-plate is a hole through which the screw F is inserted, which assists in holding the valve to the pump, pivots the cover G, and adjusts its pressure upon the packing. Surrounding the outlet in the upper side of the base-plate is a circular depression or recess, H, to hold packing. This packing is a simple disk of leather or other suitable material, having a hole through its center to correspond with that in the valve. It is of a thickness to project slightly above the surface of the plate.

The cover G is a simple plate of suitable form, having in the end which passes through the loop E a hole for the attachment of the rod or handle I, while in the other end is a hole through which passes the screw which pivots and holds it to base-plate.

At a point near the center of the cover, and which comes directly over the outlet from the pump when the cover is raised to its extreme limit by the rod I, is a hole, K, which, when in this position, completes the opening of the valve. The cover is of such a size and shape that it completely covers the packing at all times, securing it in place, and making the joint water-tight.

The whole forms a neat, simple, and effective waste-valve, by which the water may be let out of pumps to prevent freezing, and for other purposes.

The valve may be adapted to metallic pumps by simply threading the tubular part to screw into the pump, and tapping a machine-screw into base-plate to pivot the cover on.

I am aware that an opening or hole in the pump-stock below the freezing-line has been closed by a slide held to its seat by a spring, and opened by the elevation of a rod; but

What I claim, and desire to secure by Letters Patent, is—

The waste-valve composed of cover G and base-plate C, having tubular projection D, depression H, and loop E, substantially as herein shown, and for the purposes described.

PERRY A. PEER.

Witnesses:
W. W. BALDWIN,
JOHN PEER.